(12) United States Patent
Fariña

(10) Patent No.: US 10,080,993 B2
(45) Date of Patent: Sep. 25, 2018

(54) CONTINUOUS FUEL FLOW ENHANCER DEVICE FOR INTERNAL COMBUSTION ENGINES

(71) Applicant: Ricardo Nestor Fariña, Pcia. de Buenos Aires (AR)

(72) Inventor: Ricardo Nestor Fariña, Pcia. de Buenos Aires (AR)

(*) Notice: Subject to any disclaimer, the term of this patent is extended or adjusted under 35 U.S.C. 154(b) by 0 days.

(21) Appl. No.: 15/589,698

(22) Filed: May 8, 2017

(65) Prior Publication Data

US 2017/0320015 A1    Nov. 9, 2017

(30) Foreign Application Priority Data

May 9, 2016    (AR) ................................ P160101324

(51) Int. Cl.
| | |
|---|---|
| *B01D 53/94* | (2006.01) |
| *B01J 20/10* | (2006.01) |
| *B01J 20/32* | (2006.01) |
| *F01N 13/00* | (2010.01) |
| *F01N 3/022* | (2006.01) |

(52) U.S. Cl.
CPC ........ *B01D 53/9454* (2013.01); *B01J 20/103* (2013.01); *B01J 20/324* (2013.01); *F01N 3/0224* (2013.01); *F01N 13/0097* (2014.06)

(58) Field of Classification Search
CPC .... F02M 37/22; F02M 27/00; F01N 13/0097; F01N 3/0224; B01J 20/103; B01J 20/324; B01D 53/9454

USPC .................................................. 123/590, 591
See application file for complete search history.

(56) References Cited

U.S. PATENT DOCUMENTS

| | | | | |
|---|---|---|---|---|
| 5,094,747 | A * | 3/1992 | Johnson ........... | B60K 15/03504 210/266 |
| 5,507,942 | A * | 4/1996 | Davis ..................... | B01D 17/10 123/1 A |
| 6,835,218 | B1 * | 12/2004 | Drozd .................... | C10G 31/09 123/1 A |
| 2008/0210611 | A1 * | 9/2008 | Tabb ...................... | B01D 15/00 210/153 |
| 2011/0030636 | A1 * | 2/2011 | Detore .................. | F02M 27/04 123/1 A |

FOREIGN PATENT DOCUMENTS

CA    2331016 A1    12/1999

* cited by examiner

*Primary Examiner* — Hieu T Vo
*Assistant Examiner* — Arnold Castro
(74) *Attorney, Agent, or Firm* — Volpe and Koenig, P.C.

(57) ABSTRACT

Continuous fuel flow enhancer device for internal combustion engines has two internal solid phases in the fuel circulation where the following components intervene: silica gel (SiO2 nH2O) which performs a dehydration process, and in a second phase, activated carbon for organic compounds intervene, which performs an adsorption, purification and dehydration process.

3 Claims, 4 Drawing Sheets

CONTINUOUS FUEL FLOW ENHANCER DEVICE FOR INTERNAL COMBUSTION ENGINES

FIELD OF THE INVENTION

The present invention is related to the different fuels used in internal combustion engines, such as aerospace engines and turbines, as well as its industrial applications.

The present invention may be applied to engines which run on compressed natural gas, hydrogen or other gases, being such engines those which are used in automobiles, vans, trucks, generator sets, bottled gas operated machines, also including any artifact that runs on natural gas (eg.: drying and/or dehydration tunnels, furnaces and other industrial equipment, heating or any other household uses).

The present invention also applies to solid fuels such as military rocket turbines and space shuttles. It also has applications in liquid fuels, gasoline and gas oil for automobiles, vans, trucks, generators, industrial and agricultural machines, tractors, airplanes, helicopters, military rockets, space rockets, satellites, boats, motorboats, cruisers, jet skis and snowmobiles, as well as any engine or device that runs on liquid fuels such as gasoline of all kinds and octane or diesel.

The present invention is classified in the mechanical "F" section, i.e. illumination; heating; armament; blasting; being its subclass "F02", i.e. COMBUSTION ENGINES; HOT GAS OR COMBUSTION PRODUCTS POWER FACILITIES.

Likewise, and assuming that the term "feed" means forced introductions of air or air-fuel mixture into the cylinders of the engine, which also covers "overfeeding", the present invention could be classified as "F02B", i.e. PISTON INTERNAL COMBUSTION ENGINES; COMBUSTION ENGINES IN GENERAL.

We understand that the classification corresponds to "Other modes of operation of engines involving a preliminary treatment of combustion air, fuel or air/fuel mixture or involving and addition of substances to this air, this fuel or this mixture", thus same being properly classified as "F02B51".

Finally, the present invention may be classified in two different ramifications of this classification, being same "F02B51/02" involving catalysts, or "F02B51/04" involving electricity.

BACKGROUND

The operation of an internal combustion engine is based on the burning of a compressed mixture of air and fuel, within a closed chamber or cylinder, in order to increase the pressure and to generate, with the necessary power, an alternative linear movement of the piston.

Said movement is transmitted by means of the connecting rod to the main axis of the engine, i.e. the crankshaft, wherein it is converted into rotatory movement, which in turn drives the power transmission mechanisms, thus generating the necessary power to move the vehicle.

Through the combustion process developed in the cylinder, the chemical energy of the fuel is transformed into heat which is transformed into kinetic energy (i.e. movement).

In this type of engines, it is necessary to provide the mixture of air and fuel conveniently dosed, being such mixture provided by the injectors and controlled by electronic control systems. After the mixture enters the cylinder, it is necessary to generate a blast in the chamber that contains the cylinder by means of a high voltage spark generated by the spark plug. Such blast generates the ignition from which the residual gases of the blast go from the engine to the exhaust manifold, the silencer (which includes a catalyst) and finally the exhaust pipe. In such way the residual gases are purified before being released to the environment.

The present invention, in contrast to the gasoline filter whose main function is to clean the fuel of all impurities contained in the fuel tank, manages to boost the fuel and does not displace or replace such filter which maintains its original function. For such reason, all patents classified under F02M37/22 are discarded because it is not the goal of the present invention to purify the fuel.

Likewise, the present invention neither modifies nor affects the carburetor mechanism, being all patents classified under F02M in general discarded. The present invention also does not affects recirculation of gases in general, being all patents classified under F02M26/00 discarded.

Although the present invention works with solid compounds, it is not considered an additive for the fuel to improve its properties, since these are not applied on the fuel but in the device, being all patents classified under the "C" section in the IPC discarded.

Consequently, in the state of the art there are additives to improve and enhance the fuel. There are also filters of many types that purify the gasoline previous to entering the engine, and, of course, there are several devices that improve the carburetor and even other specific devices whose object is to improve the different and necessary devices in the internal combustion process.

However, there is no single, autonomous, independent device that achieves the boosting of the fuel without the addition of additives, meaning that it is not possible to achieve such goal without modifying the fuel as injected to the combustion process.

There is no device in the prior art that can enhance the combustion process without its inclusion meaning a drastic modification of pre-designed structure for the different internal combustion systems.

The present allows, by means of a simple process, to add the device of the invention to almost any internal combustion process that currently exists.

Currently, the closest prior art to the current invention is document CA2331016A1, which although it intends to solve the same problem, its contribution is deficient, the device is ornamentally different and such difference along with the lack of chemical components make such document a substantially different device from the one of the present invention which does not achieve the results the present invention produces.

The present invention has been performed with the object of solving and improving problems that occur in the internal combustion engines techniques, being same able to: a) substantially improve power and acceleration; b) provide higher efficiency to the fuel; c) reduce the emission of harmful gases such as carbon monoxide (CO), hydrocarbons (HC) and nitrogen oxides (NOx), thus avoiding the contamination of the environment.

The continuous fuel flow enhancer device for internal combustion engines provides "high energy and performance efficiency", purifying while working, refining and improving the quality of hydrocarbons mixtures of all kinds in their different states (gaseous and liquids) very quickly, and continues eliminating the compounds of residual substances (not sensitive to moisture), vapors and all humidity thereof, by injection into the combustion chamber of an excellent and high efficiency product.

Usually, each time the normal refining fuel evaporates, it represents up to 20% of the contamination of a vehicle. This device increases the fuel calorific value resulting in an extremely rich and somewhat greater stoichiometrically mixture which is very stable in practice.

The change the "enhancer" produces in the combustion chamber substantially influences the process, and as previously mentioned, improves the power, the acceleration and the consumption, as well as the thermal efficiency since the combustion is relatively brief, i.e. between 0.8 to 2 milliseconds.

SUMMARY

The present invention is addressed to a continuous fuel flow enhancer device for internal combustion engines characterized in that it comprises two internal phases in the fuel circulation wherein in the first phase a silica gel ($SiO_2$ $nH_2O$) is involved which performs a dehydration process, and in the second phase an activated carbon compound for organic compounds is involved which performs a adsorption and purification process.

In order for the device to properly work, the continuous fuel flow enhancer device consists of a first phase that includes a coupling (01) which directs the fuel into the device through a tube (05), the fuel is filtered by a metallic mesh and enters the lower section of the device wherein the silica gel component is located. Subsequently, a second phase is initiated which is activated as the fuel fills the device and makes contact with the activated charcoal compound for organic compounds, purifying and dehydrating the organic wastes, finding an escape route towards the tube (04) which has a filter coming out from the other end of a top threaded cover (03) wherein an outlet coupling (02) is located and facing the engine injection section.

ITEMS DETAIL

Figure 1:
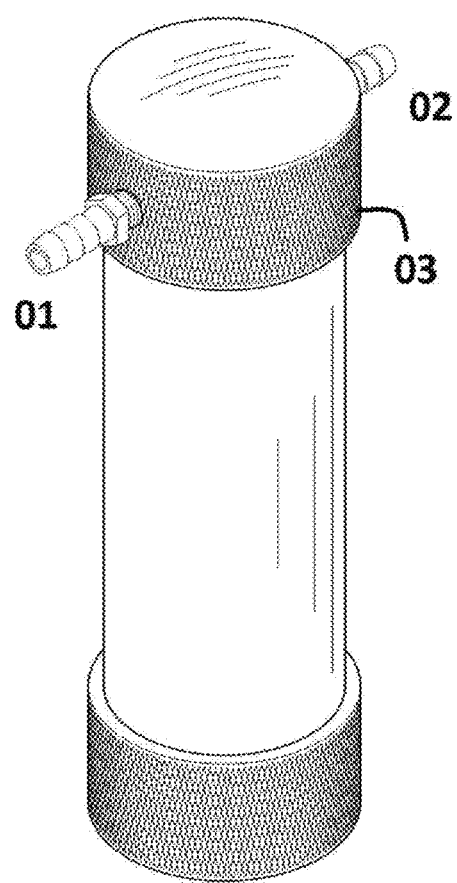
FIG. 1—PERSPECTIVE VIEW OF THE DEVICE
FIG. 2—TRANSVERSE CUT OF THE DEVICE
FIG. 3—COMPONENTS OF THE DEVICE
FIG. 4—FLOW DIAGRAM
Figure 2:
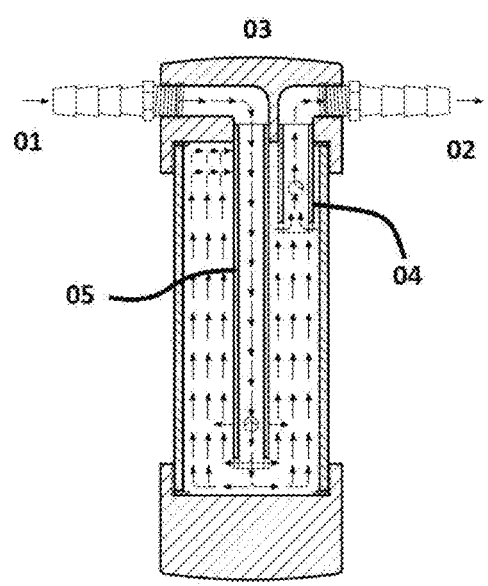
Figure 3:
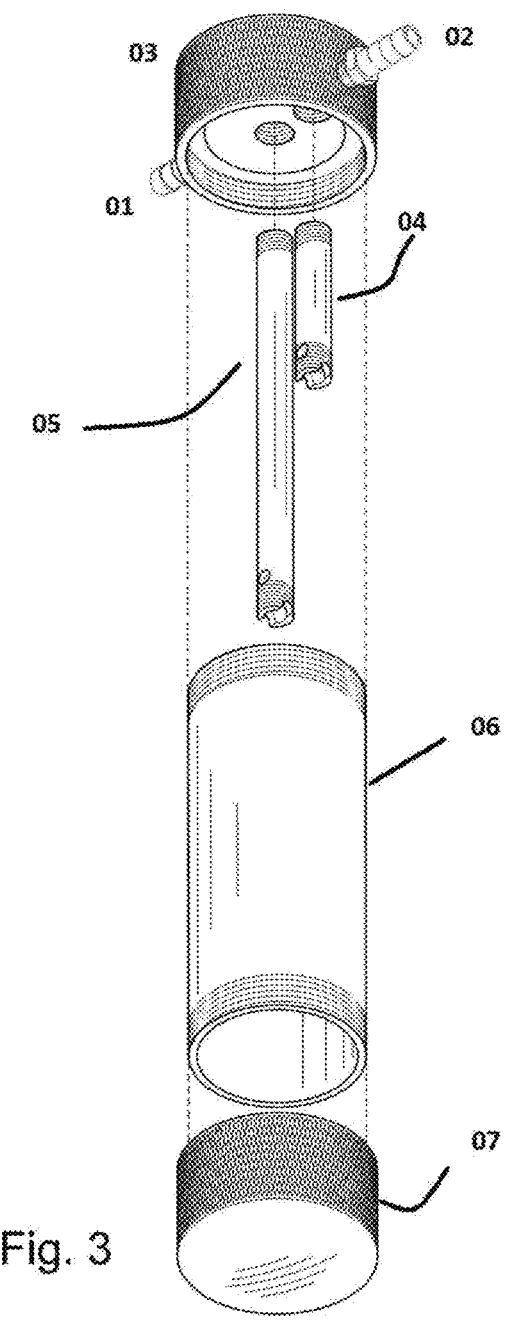
Figure 4:
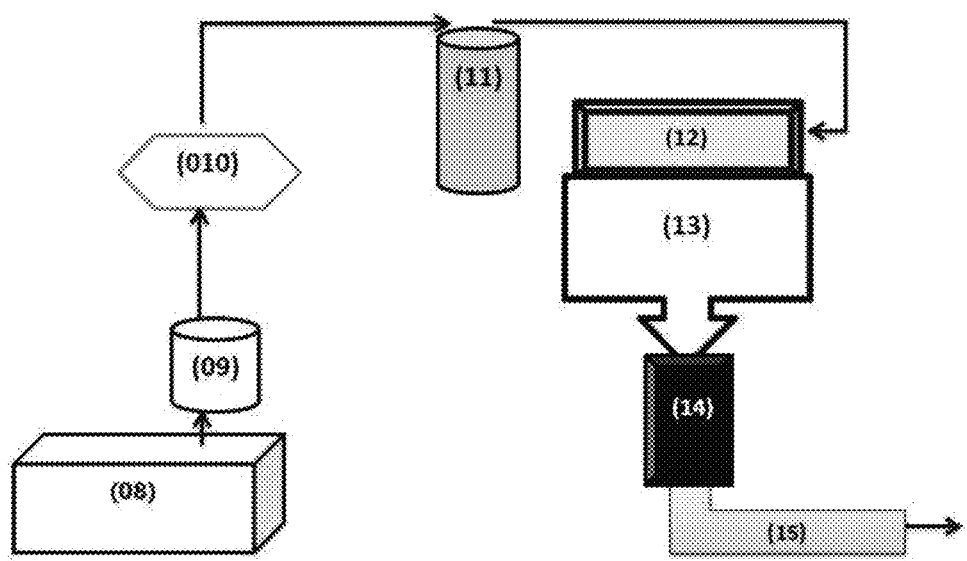

(01) Coupling
(02) Coupling
(03) Top threaded cover
(04) Outlet tube
(05) Inlet tube
(06) Cylinder
(07) Bottom threaded cover
(08) Fuel tank
(09) Electric pump
(10) Fuel filter
(11) Device
(12) Injectors
(13) Engine
(14) Catalyst
(15) Exhaust pipe
(16) Metallic mesh filter

DETAILED DESCRIPTION OF THE PREFERRED EMBODIMENTS

It can be observed that a liquid or gaseous fuel located inside a fuel tank (09) goes through an electric pump (10), subsequently through a filter (11) and enters the device through a coupling (01) which is an orifice on the side of an top cover (03) (0.5 inches with a nipple or, preferably, a male coupling of 0.25 inches). By dehydrating most of the fuel and/or gas, the device consists of a tube (16 cm in length, 3 mm in thickness, diameter of 60 mm, preferably), with a top threaded cover (03) (3.5 cm in height, diameter of 6.5 cm preferably), and a blind threaded bottom cover (07) (2.5 cm in height, diameter of 6.5 cm and made of aluminum preferably). Both the upper cover as the bottom cover have a siliconized O-ring inside (preferably of 4 mm height) which when inserted in the tube produces a sealing. The coupling (01) is connected by the inside of the top cover (03) towards its center, from which is connected to a tube (05) (14 cm in length, 0.25 inches in diameter, preferably), which is perforated in its last 2 cm and coated by bag-shaped filter (16) (preferably of fine metallic mesh of 4 cm in length) supported by a ring-shaped grip to the tube (05). The inside of the device has a 37.37% of two solid compounds $SiO_2$ $nH_2O$, and 62.63% of activated carbon for organic compounds that fill 100% of the device and do not mix with each other, being such percentages optimum operating values of reference, but not categorical for their operation. Such compounds are characterized by:

A) At the lower section silica gel components $SiO_2$ $nH_2O$ are located. Silica gel in granular and porous form of Silicon dioxide, Dehydrated Silicon Hydroxide made of solid and hard sodium silicate, which allows liquid absorption at room temperature, a highly polar substance absorbs liquids in greater proportion than organic gases and vapors. It is a humidity indicator that chemically reacts with other components, which physically generates a change in color. The little spheres catch the largest amount of humidity in the liquid or gaseous fuel, which is absorbed in a gel. Its absorption capacity is approximately 40%. The great porosity of about 800 m2/g of its specific surface, makes it a great water absorbent. When saturated, the gel can regenerate at a temperature of 120-180° C., at a ratio of 1.5 hours per liter of water. It is chemically stable, colorless, non-flammable and non-chemically reactive. It only reacts to hydrofluoric acid and alkali.

B) At the upper section, activated carbon for organic compounds is located. This activated carbon is porous and granular, traps and purifies organic compounds in gases and/or liquids. It has the property of absorbing and retaining in its walls a molecule that flows an adsorbate. The carbon atoms that form a solid or a coal are linked to each other by covalent links. There is no purification process with more applications than the activated carbon. Gases are attracted and adhere to the porous surface of the activated carbon, providing an efficiency of 95-99%. It removes $CO_2$, $H_2O$, water vapor, nitrogen, and other components with a superior purification, increasing the heat power, reducing the corrosion and increasing the life of engines and machines. Activated carbon has from 600 to 800 m2 of absorption capacity. The carbon atoms that form a solid known as coal, link each other by covalent links. Each atom shares an electron with other four carbon atoms (in ionic links the most electronegative atom "steals" one or more electrons from the other). The atoms that are not on the surface, distribute their four links in all directions, but the atoms on the surface, though linked with other four, are forced to do so in less space, resulting an imbalance of the force.

The fuel, once it enters through the coupling, is directed to the inside from the device to the tube (05), is filtered by the metallic mesh and enters the lower section of the device wherein the silica gel component ($SiO_2$ $nH_2O$) is located, which dehydrates most of the fuel and/or gas. The incorporated dehydrated fuel, as long as it completes the inside of the device, makes contact with the activated carbon for organic compounds purifying the organic residues and dehydrating, in a second step the fuel and purifying the coarse particles. As the liquid fuel fills the inside of the device, it finds an escape route towards the tube (04) (of 5 cm in diameter, preferably), which has a similar filter to the first one that comes out of the other end of the upper threaded cover (03) wherein is located the outlet coupling (02), facing the engine injection section.

The internal combustion process achieved by the present device is able to: a) substantially improve the power and acceleration; b) provide greater fuel efficiency; c) reduce the emission of harmful gases such as carbon monoxide (CO), hydrocarbons (HC) and nitrogen oxides (NOx), thus avoiding the contamination of the environment.

The present invention works purifying while working, refining and improving the quality of hydrocarbons mixtures of all kinds in their different states (gaseous and liquids) very quickly, and continues eliminating the compounds of residual substances (not sensitive to moisture), vapors and all humidity thereof, by injection into the combustion chamber of an excellent and high efficiency product. Usually, each time the normal refining fuel evaporates, it represents up to 20% of the contamination of a vehicle. This device increases the fuel calorific value resulting in an extremely rich and somewhat greater stoichiometrically mixture which is very stable in practice. The process inside the device achieves an excellent thermic performance due to the fact that the combustion is relatively brief, i.e. between 0.8 to 2 milliseconds. The flame velocity reaches its highest value when the fuel-air mixture is a bit richer than the stoichiometric ratio, and when reducing the variables of chemical residues/humidity, increases and improves the optimum combustion speed.

The result of the present invention increases the power of the engines in an estimated equivalent of an extra 30 HP, providing a greater acceleration and speed in a more stable and serene form.

Among other benefits, the present invention increases the purity of the fuel and thus substantially increases the power and greatly reduces fuel consumption, which is between 15/21%, obtaining a greater autonomy in kilometers according to the type of hydrocarbon used. Both gaseous and liquid fuels behave normal and stable, in a very rich mixture, being gasolines of 95 octanes equivalent to gasolines of 98 octanes, and gasolines of 98 octanes equivalent to gasolines of 100 octanes.

The device achieves an ostensible reductions or carbon in cylinder caps, pistons, valves and injectors, spark plugs and/or heaters, thus achieving a longer life of the engines and/or machines in addition to the corresponding exhaust gases catalysts. The device object of the present invention contributes in "high reduction of residual gases emissions", which considerably increases the useful life of the catalysts, optimizing their operation in gas emission to the atmosphere. It is to be noted that, unlike other devices, the one of the present invention can be used in environments lacking of oxygen and gravity, being able to have several applications besides being a reaction and heat accelerator for internal combustion, combustion enhancer, turbo-combustion booster, hydrocarbon thermal reaction improver, controlled catalytic partial oxidation improver. It increases acceleration, reaction, force, speed, improves quality of the hydrocarbons and of the thermal combustion, reducing the gaseous/liquids fuels consumption, also improving the quality thereof.

The invention claimed is:

1. A continuous fuel flow enhancer device for internal combustion engines comprising two internal solid phases in a fuel circulation wherein the following components intervene: silica gel ($SiO_2$ $nH_2O$) which performs a dehydration process, and in a second phase wherein activated carbon for organic compounds intervene, which performs an adsorption, purification and dehydration process, and wherein the device further comprises a first phase that begins with a coupling (01) which directs the fuel inside the device through a tube (05), and is filtered by a metallic mesh and enters a lower section of the device where the silica gel component is located.

2. A continuous fuel flow enhancer device for internal combustion engines comprising two internal solid phases in the fuel circulation wherein the following components intervene: silica gel ($SiO_2$ $nH_2O$) which performs a dehydration process, and in a second phase where activated carbon for organic compounds intervene, which performs an adsorption, purification and dehydration process, wherein the device further comprises a second phase in which as the fuel fills the device, the fuel makes contact with the activated carbon for organic compounds, purifying the organic residues and dehydrating same, exiting towards a tube (04) which has a filter coming out of an end opposite an upper threaded cover (03) in which an outlet coupling (02) is located and leads towards an engine injection section.

3. The continuous fuel flow enhancer device for internal combustion engines according to claim 1, wherein the device further comprises a second phase in which as the fuel fills the device, the fuel makes contact with the activated carbon for organic compounds purifying the organic residues and dehydrating same, exiting towards a tube (04) which has a filter coming out of an end opposite an upper threaded cover (03) in which an outlet coupling (02) is located and leads towards an engine injection section.

* * * * *